United States Patent
Day et al.

(10) Patent No.: US 6,365,703 B1
(45) Date of Patent: Apr. 2, 2002

(54) BRANCHED POLYCARBONATE AND METHOD

(75) Inventors: James Day, Scotia, NY (US); Sukhendu Bikash Hait, Tuscaloosa, AL (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 09/681,748

(22) Filed: May 31, 2001

(51) Int. Cl.[7] .............................................. C08G 64/00
(52) U.S. Cl. ...................................... 528/196; 528/198
(58) Field of Search .................................. 528/196, 198

(56) References Cited

U.S. PATENT DOCUMENTS

| | | | |
|---|---|---|---|
| 5,710,238 A | 1/1998 | Sivaram et al. ............. | 528/196 |
| 5,717,056 A | 2/1998 | Varadarajan et al. ........ | 528/196 |
| 6,031,063 A | 2/2000 | Day et al. ................... | 528/196 |

Primary Examiner—Terressa M. Boykin
(74) Attorney, Agent, or Firm—Andrew J. Caruso; Noreen C. Johnson

(57) ABSTRACT

The present invention discloses a vapor phase method of introducing a branching agent such as THPE into a solid polycarbonate while simultaneously crystallizing the solid polycarbonate. The partially crystalline polycarbonate containing a branching agent introduced in this manner is suitable for use in the preparation of branched polycarbonates by solid state polymerization. Branching in the polycarbonates so produced is demonstrated by rheometric measurements. Such branched polycarbonates are known to possess increased material melt strength, shear sensitivity, and complex viscosity ratio, and are particularly well-suited in blow molding applications.

15 Claims, 2 Drawing Sheets

BRANCHED POLYCARBONATE AND METHOD

BACKGROUND OF THE INVENTION

The present invention relates to an improved branched polycarbonate and method for making said polycarbonate by incorporating a branching agent in the vapor phase prior to solid state polymerization (SSP). More particularly, the present invention provides a method for the preparation of branched polycarbonate by solid state polymerization wherein a mixture of branching agent and partially crystalline precursor polycarbonate is prepared by exposure of an unbranched, amorphous precursor polycarbonate to a vapor phase mixture comprising a solvent and branching agent such as 1,1,1 -tris(4-hydroxyphenyl)ethane (THPE). The treated precursor is then converted into a branched polycarbonate by SSP.

Polycarbonate resins are widely utilized, including in blow molding applications. For such applications, polycarbonates must possess high melt strengths, high shear sensitivities and high complex viscosity ratios. A certain threshold degree of internal branching is necessary for polycarbonates to achieve such characteristics. Historically, two basic methods have been used for the preparation of branched polycarbonates: interfacial polycondensation and melt phase carbonate interchange. Both methods typically employ polyhydric phenols such as THPE as branching agents.

Under interfacial polycondensation conditions, a dihydroxyaromatic compound together with a branching agent is contacted with phosgene in an aqueous-organic solution, mixed with an acid acceptor and an amine catalyst. Alternatively, the method involves the interfacial preparation of oligomeric chloroformates, which are then converted to high molecular weight polycarbonate by partial chloroformate group hydrolysis and polycondensation.

Branching agents, such as 1,1,1-tris-(hydroxyphenyl) ethane (THPE); and 1,3,5-tris-(4-hydroxyphenyl)benzene are polyhydric phenols having at least three hydroxy groups per molecule, have been used to prepare high melt strength blow moldable polycarbonate resins by interfacial polycondensation. Numerous other branching agents, including cyanuric chloride; and 3,3-bis-(4-hydroxyphenyl)oxyindoles, have also been used, as well as 1,2,3-trihydroxybenzene; 1,3,5-trihydroxybenzene; 1,3,5-tris(2-hydroxyethyl) cyanuric acid; 4,6-dimethyl-2,4,6-tris(4-hdroxyphenyl) heptane; 2,3,4-trihydroxyacetophenone; 2,3,4-trihydroxybenzophenone and 2,4,4"-trihydroxybenzophenone.

There are significant disadvantages inherent in the interfacial polycondensation process. First, toxic and hazardous phosgene is utilized as the source of carbonate units in these reactions. Also, the interfacial polycondensation process employs a chlorinated hydrocarbon, such as methylene chloride, as the organic solvent which requires substantial and costly environmental management to prevent unintended solvent emissions. Furthermore, the product polycarbonate contains residual sodium and chloride ions which adversely affect the hydrolytic stability of the product.

Alternatively, branched polycarbonates can be prepared from melt phase carbonate interchange reactions. Generally in a melt phase process, a bisphenol and a diaryl carbonate are contacted in the melt at a temperature in a range between about 270 and about 350° C. in the presence of a suitable melt polymerization catalyst. An oligomeric polycarbonate is thereby produced, usually with an average molecular weight between 2,000 and 10,000 as determined by gel permeation chromatography, which can be relative to polycarbonate or polystyrene. The produced oligomer is then converted to a high molecular weight polycarbonate increasing the polymerization temperature and reducing the pressure of the reaction vessel. Branching agents used in melt phase processes include THPE, triphenyl trimellitate, triglycidyl isocyanurate, and 3,3-bis-(4-hydroxyphenyl) oxyindoles.

It is clear that melt phase processes suffer from a number of disadvantages as well. At high conversions (>98%), viscosity of the melt increases significantly. This is a major disadvantage because handling of high viscosity melt polymerization mixtures at high temperature is extremely difficult. Increased viscosity of the polymerization mixture leads to poor mixing and the generation of hot spots which can lead to the loss of product quality. Also, this process requires custom equipment such as a Helicone mixer operating at temperatures in the range of 270 300° C. and capable of operation at subambient pressures.

Recent developments have resulted in the use of solid state polymerization as an alternative vehicle for preparing high-molecular weight polycarbonates. SSP reactions occur at substantially lower temperatures, specifically within the range of 180 230° C. Solid state polymerization is amenable to the use of relatively low molecular weight polycarbonate oligomers having very low melt viscosities, produced via ester interchange, which are subsequently converted to high molecular weight polycarbonate in the solid state. Hence, the SSP process does not require handling of viscous, molten polycarbonate melt at high temperatures during the polymerization step. Moreover SSP permits the avoidance the large scale use of both phosgene gas and halogenated solvents such as methylene chloride. Finally, the SSP process step itself does not require specialized custom equipment.

Solid state polycondensation processes entail subjecting a suitable oligomer to programmed heating at a temperature above its glass transition temperature and below its sticking temperature while removing the volatile by-product. The polycondensation reaction can proceed strictly in the solid state under these conditions.

The typical SSP process to form a branched polycarbonate is twofold. First, a low melt viscosity linear oligomer is synthesized by the melt phase reaction of a bisphenol with a diaryl carbonate. Generally, a mixture of a dihydroxydiaryl compound and a diaryl carbonate is heated at about 150° C. to about 325° C. for a period of from about 4 to about 10 hours in the presence of a transesterification catalyst. This affords a polycarbonate oligomer having a weight average molecular weight in a range between about 2,000 and about 20,000 Daltons, said polycarbonate oligomer having both hydroxyl and carbonate end groups. Second, crystallization of the linear polycarbonate oligomer is effected by (a) dissolving the oligomer, a branching agent and a suitable catalyst in a solvent such as chloroform and then evaporating the solvent; (b) suspending the oligomer in diluent containing a branching agent and refluxing it for 0 to 10 hrs with a suitable catalyst and evaporating the diluent; or (c) heating the mixture of linear oligomer and branching agents at a temperature which is higher than the glass transition temperature of the polycarbonate and below its melting point in the presence of a catalyst. Each of crystallization methods (a), (b) and (c) to affords a partially crystalline mixture of linear polycarbonate oligomer, branching agent and catalyst which is suitable for use in solid state polymerization.

Typically, aliphatic aromatic hydrocarbons, ethers, esters, ketones, and halogenated aliphatic and aromatic hydrocarbons are preferred as solvents and diluants. The resulting oligomer should have a crystallinity range of between 5% and 55% as measured by a differential scanning calorimeter. At crystallinity levels above 55% the polymerization rate under solid state polymerization conditions is too low to be practical. Crystallinity level below 5% will likewise result in low or negligible solid state polymerization rates due to fusion of the precursor polycarbonate.

The crystallized oligomer, the branching agent and a suitable catalyst produced by methods (a), (b) or (c) above are heated under SSP reactions. The reaction temperature and time may vary according to the type (chemical structure, molecular weight, etc.) of partially crystallized oligomer as well as the physical form of the partially crystallized oligomer (pellets, powder, flake and the like). However, the polymerization temperature should be at least above the glass transition temperature of the polycarbonate and below the melting or sticking point of the oligomer. At this temperature the oligomer should not fuse during the solid state polycondensation. Since both the glass transition temperature and the melting point of the crystallized oligomer increases during the course of polycondensation, it is therefore desirable to increase the polycondensation temperature gradually. Generally the temperature should be 10–50° C. below the melting point of the oligomer and it should be in the range of 150–250° C. and more preferably between 180 and 220° C.

In order to allow the SSP reaction to progress, the by-product, such as phenol or diphenol carbonate should be removed from the reaction system during the solid state polycondensation process. An inert gas is passed through the system to aid in the removal of the by-product. The inert gases which are generally used are $N_2$, He, Ar and the like, and the flow rate of the inert gases is varied depending upon the type of reactor and the particle size of the oligomer. In a laboratory setting, flow rates of between 0.1 and 5 liters per minute are typical. The rate of polycondensation may be strongly dependent on the identity and the flow rate of the carrier gas.

After solid state polymerization has been completed, the amount of branching agent incorporated in the polycarbonate can be determined by complete hydrolysis of the polycarbonate followed HPLC analysis of the hydrolysis products using an internal standard. Any unreacted branching agent may be removed prior to hydrolysis by dissolution of the branched polycarbonate in a solvent such as chloroform and reprecipitation by addition to methanol or ethyl acetate.

SUMMARY OF THE INVENTION

The present invention addresses the foregoing problems, and provides further surprising advantages and properties. These and further objects of the invention will be more readily appreciated when considering the following disclosure and appended claims.

In one aspect, the present invention relates to a method for preparing a branched polycarbonate prepared via SSP. The method first involves the exposure of a solid, amorphous polycarbonate precursor to a mixture comprising solvent and branching agent vapors which results in the production of a partially crystalline polycarbonate precursor containing said branching agent. This partially crystalline precursor containing the branching agent is then subjected to SSP to form a branched polycarbonate.

The present invention further relates to a method for preparing branched polycarbonate wherein THPE is used as a branching agent said THPE being incorporated into a mixture comprising the partially crystalline precursor polycarbonate and the THPE branching agent via exposure of a linear, amorphous polycarbonate to a mixture comprising solvent vapors and THPE vapors.

BRIEF DESCRIPTION OF THE DRAWINGS

The features and advantages of the present invention will become apparent from the following detailed description of the invention which when read with the accompanying FIGURES illustrate preferred embodiments of the invention.

DETAILED DESCRIPTION

Figure 1:
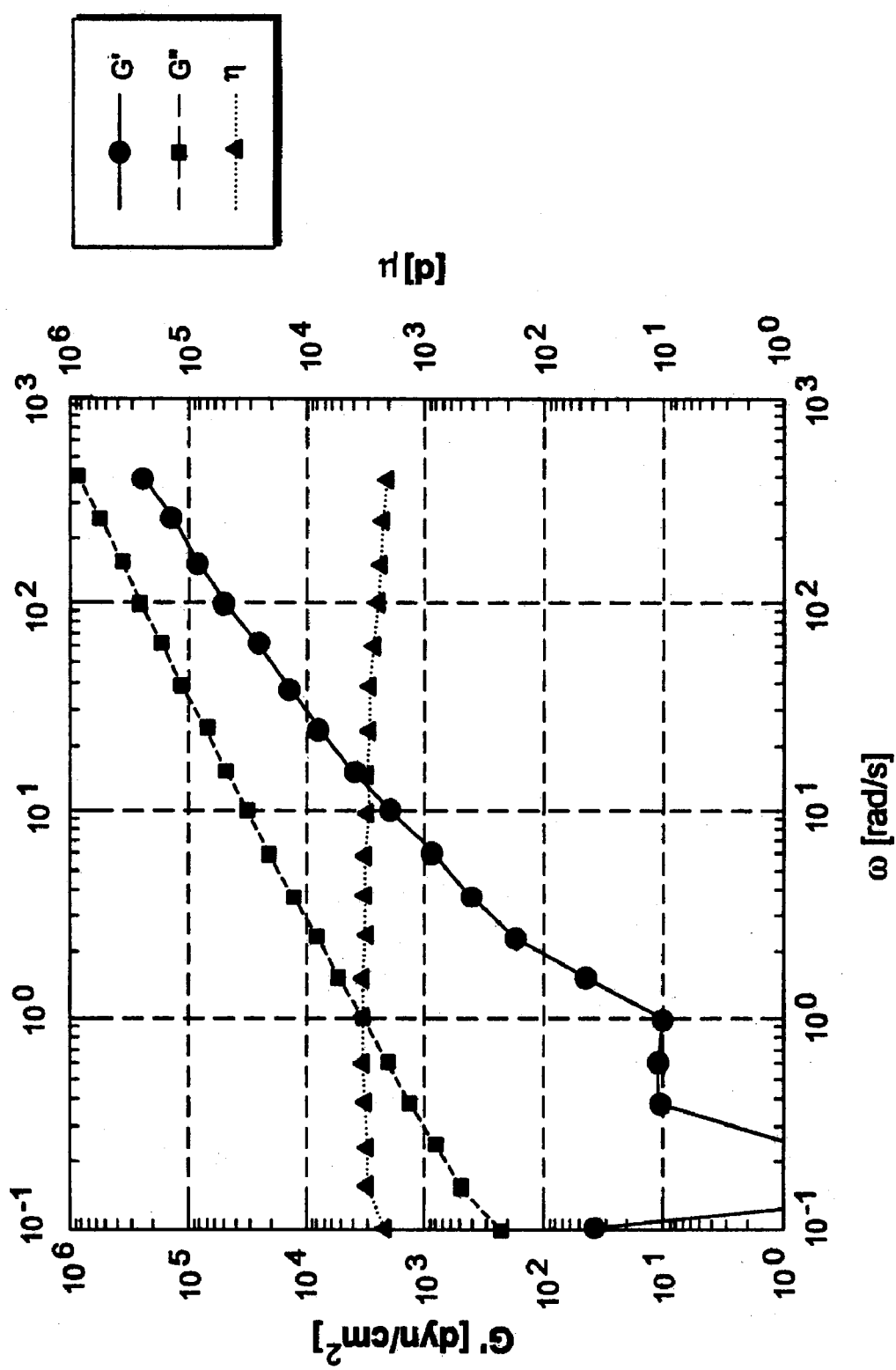
FIG. 1 shows the rheometry results for a control sample.

The present invention may be understood more readily by reference to the following detailed description of preferred embodiments of the invention and the examples included herein. In this specification and in the claims which follow, reference will be made to a number of terms which shall be defined to have the following meanings.

The singular forms "a", "an" and "the" include plural referents unless the context clearly dictates otherwise.

"Optional" or "optionally" mean that the subsequently described event or circumstance may or may not occur, and that the description includes instances where said event or circumstance occurs and instances where it does not.

As used herein the term "interfacial process" refers to a process comprising the simultaneous use of water and a water immiscible solvent.

The term "polycarbonate" as used herein includes copolycarbonates, homopolycarbonates and (co)polyestercarbonates.

As used herein the term "aromatic radical" refers to a radical having a valence of at least one comprising at least one aromatic group. Examples of aromatic radicals include phenyl, pyridyl, furanyl, thienyl, naphthyl, phenylene, biphenyl. The term includes groups containing both aromatic and aliphatic components, for example a benzyl group.

As used herein the term "aliphatic radical" refers to a radical having a valence of at least one comprising a linear or branched array of atoms which is not cyclic. The array may include heteroatoms such as nitrogen, sulfur and oxygen or may be composed exclusively of carbon and hydrogen. Examples of aliphatic radicals include methyl, methylene, ethyl, ethylene, hexyl, hexamethylene and the like.

As used herein the term "cycloaliphatic radical" refers to a radical having a valance of at least one comprising an array of atoms which is cyclic but which is not aromatic. The array may include heteroatoms such as nitrogen, sulfur and oxygen or may be composed exclusively of carbon and hydrogen. Examples of cycloaliphatic radicals include cyclcopropyl, cyclopentyl cyclohexyl, tetrahydrofuranyl and the like.

A primary objective of the present invention relates to branched polycarbonates and the method of adding and incorporating THPE as a branching agent prior to the production of polycarbonate via SSP. The invention is based on the discovery of a new vapor phase method of incorporating a branching agent such as THPE into the precursor polycarbonate during vapor phase crystallization. A vapor phase mixture comprising 3-pentanol and THPE is used to crystallize a polycarbonate precursor while simultaneously introducing the THPE branching agent to produce a partially crystalline precursor polycarbonate which affords a branched polycarbonate upon solid state polymerization. A surface crystallized precursor polycarbonate may be obtained using the method of the present invention.

In one aspect, the present invention is directed to the incorporation of branching agents in polycarbonates comprising repeat units having Structure I:

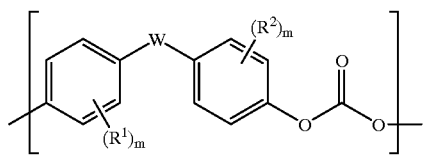

wherein $R^1$ and $R^2$ are independently fluorine, chlorine, bromine, aliphatic, cycloaliphatic or aromatic radicals, n and m are integers having values of 0 to 4, and W is an aliphatic radical, a cycloaliphatic radical an aromatic radical, or an oxygen, sulfur, SO or $SO_2$ linking group.

Polycarbonates comprising repeat units I are typically derived from bisphenols via melt or interfacial polycarbonate synthesis. Said bisphenols may be any of those known in the art to be useful for manufacturing polycarbonates. Examples of bisphenols suitable for incorporation into polycarbonates comprising repeat units having formula I include:bis(4-hydroxyphenyl)methane; 1,1 -bis(4-hydroxyphenyl) ethane; 2,2-bis(4-hydroxyphenyl)propane (bisphenol-A); 2,2-bis(4-hydroxyphenyl)butane; 2,2-bis(4-hydroxyphenyl)octane; 2,2-bis(4-hydroxy-1-methylphenyl) propane; 1,1 -bis(4-hydroxy-t-butylphenyl) propane; 2,2-bis (4-hydroxy-3-bromophenyl)propane; 1,1-bis(4-hydroxyphenyl)cyclopentane; 1,1-bis(4-hydroxyphenyl) cyclohexane; 4,4'-dihydroxydiphenyl ether;4,4'-dihydroxy-3,3'-dimethylphenyl ether; 4,4'-dihydroxydiphenyl sulfide; 4,4'-dihydroxy-3,3'-dimethyidiphenyl sulfide; 4,4'-dihydroxydiphenyl sulfoxide; 4,4'-dihydroxy-3,3'-dimethyldiphenyl sulfoxide;4,4'-dihydroxydiphenyl sulfone; and 4,4'-dihydroxy-3,3'-dimethyldiphenyl sulfone.

The most preferred polycarbonates are those derived entirely or in part from 2,2-bis(4-hydroxyphenyl)propane, also known as "bisphenol A".

The precursor polycarbonate useful for the preparation of branched polycarbonates by the method of the present invention may be a polycarbonate oligomer of the type produced by the first step of a melt polycarbonate process in which a bisphenol such as bisphenol A is reacted in the in the molten state with a diaryl carbonate such as diphenyl carbonate in the presence of a catalyst such as tetramethyl ammonium hydroxide. Alternatively the precursor polycarbonate may be prepared by bischloroformate oligomer preparation followed by hydrolysis and chain growth. Oligomeric precursor polycarbonates useful in the instant invention may have weight average molecular weights in a range between about 2000 and about 20000 Daltons as measured by gel permeation chromatography using chloroform as the eluant. Alternatively the precursor polycarbonate comprising structural units I may be a relatively high molecular weight polycarbonate having weight average molecular weights in a range between about 20000 and about 100000 Daltons.

The precursor polycarbonate may also be a copolycarbonate, particularly a copolycarbonate oligomer or a high molecular weight copolycarbonate, which contains units adapted to maximize solvent resistance. Hydroquinone and methylhydroquinone carbonate units are particularly preferable for maximizing solvent resistance.

Further, the precursor polycarbonate may be a recycled polycarbonate (e.g., polymers recycled from compact disks may be used). These recycled polycarbonates may originally have been prepared by interfacial polymerization, melt polymerization, or from bischloroformates. The precursor polycarbonates from such recycled sources may be produced by first dissolving scrap polycarbonate in a solvent, such as chloroform, methylene chloride or 1,2-dichloroethane, and then separating the soluble polycarbonate constituents by filtration from the insoluble material. These recycled polycarbonates generally have molecular weights that are less than that of the originally polymerized material. In some instances such recycled polycarbonates have intrinsic viscosities in the range between about 0.25 and about 1.0 dl/g as measured in chloroform at 25° C. In addition, other polycarbonate waste materials, such as polycarbonate extruder wastes, may also be used as precursor polycarbonates.

Branched polycarbonate resins are characterized in part by enhanced melt strengths and melt elasticities. They are particularly useful, for example, as blow moldable resins which are employed in the fabrication of containers (e.g., water bottles, cans and gas tanks). Branched polycarbonates are also useful in applications such as profile extrusion (for example of wire and cable insulation, extruded bars, pipes, fiber optic buffer tubes, and sheets) and thermoforming (for example of automotive exterior applications and food packaging), all of which require enhanced flow properties.

Alcohol liquid and vapors have been used to crystallize both high molecular weight polycarbonates and polycarbonate oligomers. The present technique utilizes alcohol vapors which contact and crystallize polycarbonate polymers, copolymers or oligomers said polycarbonate being in the form of pellets or particulates. The method provides the added benefit of accelerating downstream SSP. It has also been unexpectedly discovered that when the solvent vapors employed to effect crystallization also contain a branching agent such as THPE the composition, following the SSP process, exhibits rheological properties consistent with the incorporation of the branching agent.

In the method of the instant invention polycarbonate is exposed to a mixture of solvent vapors containing branching agent, whereby the polycarbonate is crystallized, giving a partially crystallized precursor polycarbonate. During exposure of the precursor polycarbonate to the mixture containing solvent vapors and branching agent significant amounts of the branching agent are absorbed such that the partially crystallized precursor polycarbonate contains branching agent when it is subjected to solid state polymerization. An amount of branching agent is significant when, after solid state polymerization, branching is detectable by rheometry.

The method of the present invention is illustrated by the following examples.

EXAMPLE 1

The following example is set forth to provide those of ordinary skill in the art with a detailed description of how the methods claimed herein are evaluated, and are not intended to limit the scope of what the inventors regard as their invention. Unless indicated otherwise, parts are by weight, temperature is in C.

In one embodiment an amorphous precursor polycarbonate is suspended in the headspace of a crystallization apparatus described in U.S. Pat. No. 6,031,063, above a solution containing 1.5 weight percent THPE in 3-pentanol. Upon heating the apparatus vapors emanating from the solution below both crystallize and introduce a significant amount of THPE into the polycarbonate being crystallized. THPE apparently has a vapor pressure at the crystallization temperature of 150° C. sufficient to allow its transfer from the solution to the polycarbonate via the vapor state. In addition, there is an affinity for the polymer to absorb THPE. The extent of absorption depends on the concentration of THPE in the crystallization solvent, the temperature, and the duration of exposure of the polycarbonate to the crystallization conditions.

Upon crystallization and introduction of the branching agent, 100 grams of crystallized polymer containing the branching agent were subjected to solid state polymerization in a tumbler reactor at 220° C. for 2 hours and 230° C. for 2 hours under a stream of inert gas. The final polymer had a $T_g$ of 147.6° C., a $M_w$ of 47,000 which is the polystyrene standard, and a $M_n$ of 19,000. $M_w/M_n$ is equal to 2.47.

The crystallization apparatus consisted of a pressurizable vessel serving as a liquid reservoir and a sample holding screen of adjustable height, adapted to be submerged in liquid in the reservoir or positioned in the space above the liquid. This vessel was charged with the THPE/3-pentanol mixture and samples of amorphous bisphenol A polycarbonate pellets (about 4 mm diameter) were placed on the screen, which was pre-positioned above the solution of THPE in 3-pentanol. The vessel was sealed and heated so as to produce an autogenous pressure of vapors therein. The polycarbonate samples were exposed to the THPE/3-pentanol vapors for a period of time. The partially crystalline polycarbonate precursor containing THPE was then subjected to solid state polymerization after which the modulus of elasticity was determined.

Figure 2:
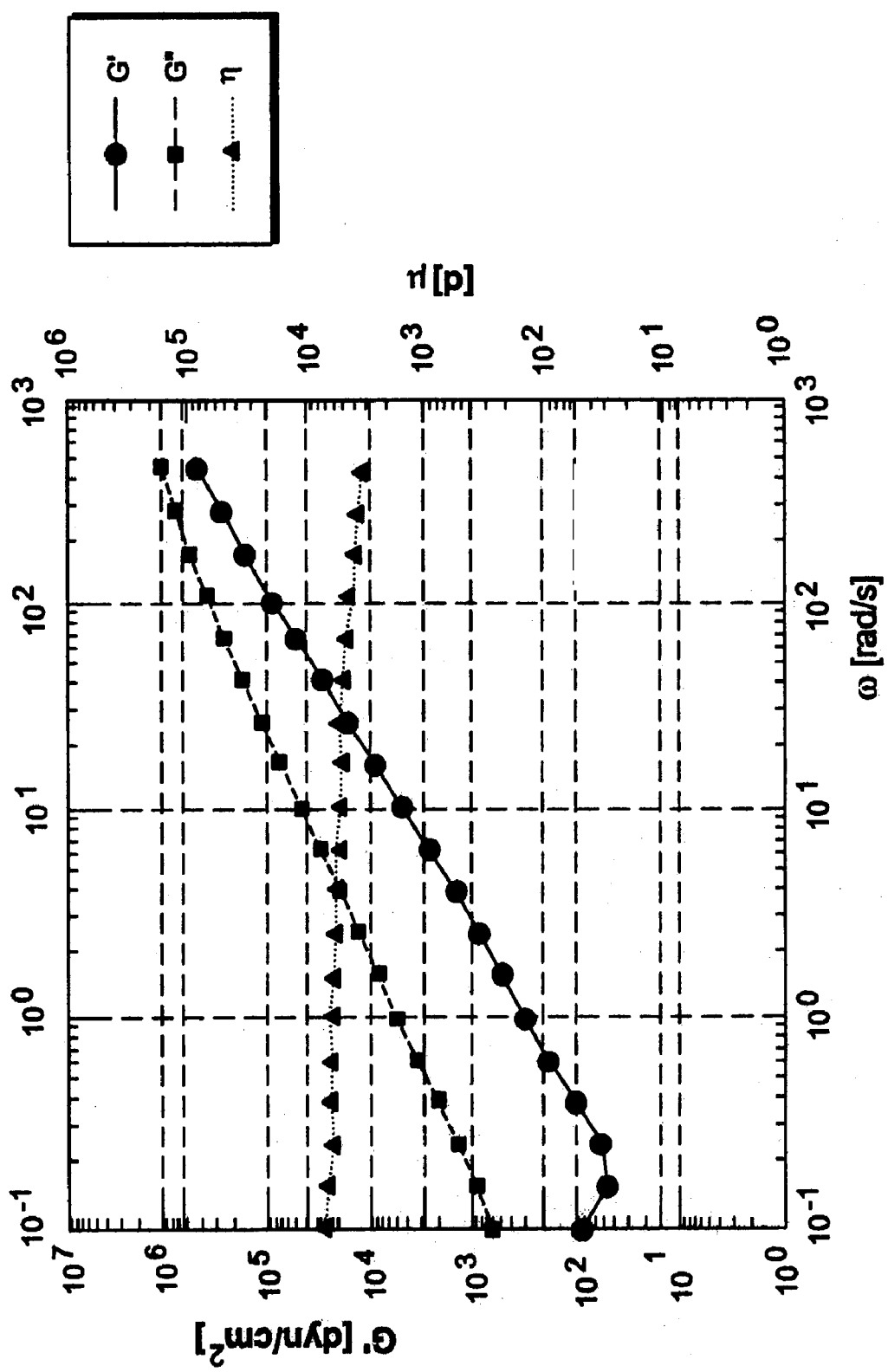
FIG. 2 shows the rheometry results for a sample prepared in accordance with the present invention and illustrates the incorporation of branching agent.

The rheometric results of the polycarbonate with and without THPE are provided in FIGS. 1 and 2. In FIG. 2, the lower curve G" indicates that a significant increase in the modulus of elasticity occurs upon incorporation of THPE. The high modulus of the THPE sample indicates that branching has occurred in comparison to the control sample.

The invention has been described in detail with particular reference to preferred embodiments thereof, but it will be understood by those skilled in the art that variations and modifications can be effected within the spirit and scope of the invention.

What is claimed is:

1. A method for preparing a branched polycarbonate via solid state polymerization, said method comprising:

a) exposing a solid amorphous polycarbonate precursor comprising repeat units I

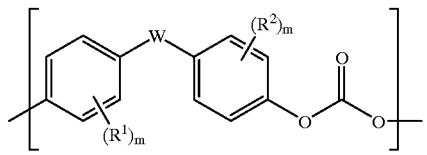

wherein $R^1$ and $R^2$ are independently fluorine, chlorine, bromine, aliphatic, cycloaliphatic or aromatic radicals, n and m are integers having values of 0 to 4, and W is an aliphatic radical, a cycloaliphatic radical an aromatic radical, or an oxygen, sulfur, SO or $SO_2$ linking group, to a mixture comprising solvent vapors and branching agent vapors to produce a partially crystalline precursor polycarbonate containing said branching agent; and b) subjecting said precursor polycarbonate to SSP to form said branched polycarbonate.

2. A method according to claim 1, wherein said branching agent is selected from the group consisting of: 1,1,1-tris-(4-hydroxyphenyl)ethane (THPE); and 1,3,5-tris-(4-hydroxyphenyl)benzene; 1,2,3-trihydroxybenzene; 1,3,5-trihydroxybenzene; 1,3,5-tris(2-hydroxyethyl)cyanuric acid; 4,6-dimethyl-2,4,6-tris(4-hydroxyphenyl)heptane; 2,3,4-trihydroxyacetophenone; 2,3,4-trihydroxybenzophenone and 2,4,4"-trihydroxybenzophenone.

3. A method according to claim 1, wherein said polycarbonate is bisphenol A polycarbonate.

4. A method according to claim 1, wherein said precursor polycarbonate has a weight average molecular weight in a range between about 2000 and about 20000 Daltons.

5. A method according to claim 1, wherein said precursor polycarbonate has a weight average molecular weight in a range between about 20000 and about 100000 Daltons.

6. A method according to claim 1, wherein said solvent is selected from the group consisting of: aliphatic aromatic hydrocarbons, ethers, esters, ketones, halogenated aliphatic and halogenated aromatic hydrocarbons.

7. A method according to claim 1, wherein the solvent is 3-pentanol.

8. A method according to claim 7, wherein said branching agent is selected from the group consisting of: 1,1,1-tris-(4-hydroxyphenyl)ethane (THPE); and 1,3,5-tris-(4-hydroxyphenyl)benzene; 1,2,3-trihydroxybenzene; 1,3,5-trihydroxybenzene; 1,3,5-tris(2-hydroxyethyl)cyanuric acid; 4,6-dimethyl-2,4,6-tris(4-hydroxyphenyl)heptane; 2,3,4-trihydroxyacetophenone; 2,3,4-trihydroxybenzophenone and 2,4,4"-trihydroxybenzophenone.

9. A method according to claim 7, wherein said polycarbonate is bisphenol A polycarbonate.

10. A method according to claim 7, wherein said precursor polycarbonate has a weight average molecular weight in a range between about 2000 and about 100000 Daltons.

11. A method according to claim 7, wherein said solvent is selected from the group consisting of: aliphatic aromatic hydrocarbons, ethers, esters, ketones, halogenated aliphatic and halogenated aromatic hydrocarbons.

12. A method for preparing a branched polycarbonate via solid state polymerization, said method comprising:

a) exposing a solid amorphous polycarbonate precursor comprising repeat units I

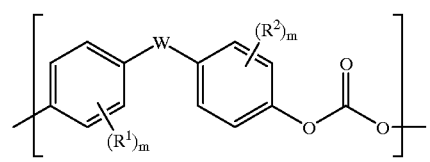

wherein $R^1$ and $R^2$ are independently fluorine, chlorine, bromine, aliphatic, cycloaliphatic or aromatic radicals, n and m are integers having values of 0 to 4, and W is an aliphatic radical, a cycloaliphatic radical an aromatic radical, or an oxygen, sulfur, SO or $SO_2$ linking group, to a mixture comprising 3-pentanol vapors and THPE vapors to produce a partially crystalline precursor polycarbonate containing said THPE; and b) subjecting said polycarbonate precursor to SSP to form said branched polycarbonate.

13. A method according to claim 12, wherein said polycarbonate is bisphenol A polycarbonate.

14. A method according to claim 12, wherein said precursor polycarbonate has a weight average molecular weight in a range between about 2000 and about 20000 Daltons.

15. A method according to claim 12, wherein said precursor polycarbonate has a weight average molecular weight in a range between about 20000 and about 100000 Daltons.

* * * * *